Feb. 24, 1959 J. MADDOX, JR 2,875,135
GEOMICROBIOLOGICAL PROSPECTING
Filed Dec. 28, 1956 2 Sheets-Sheet 1
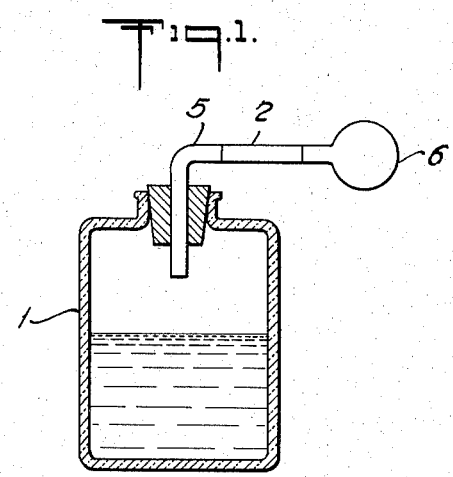
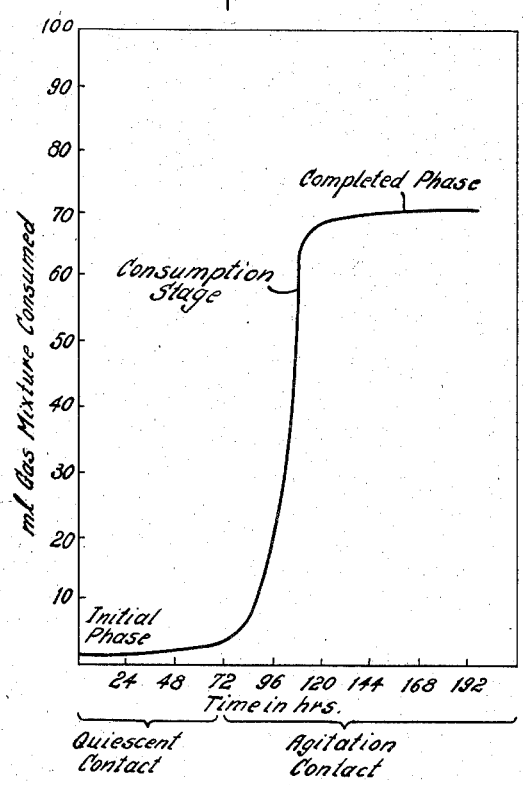

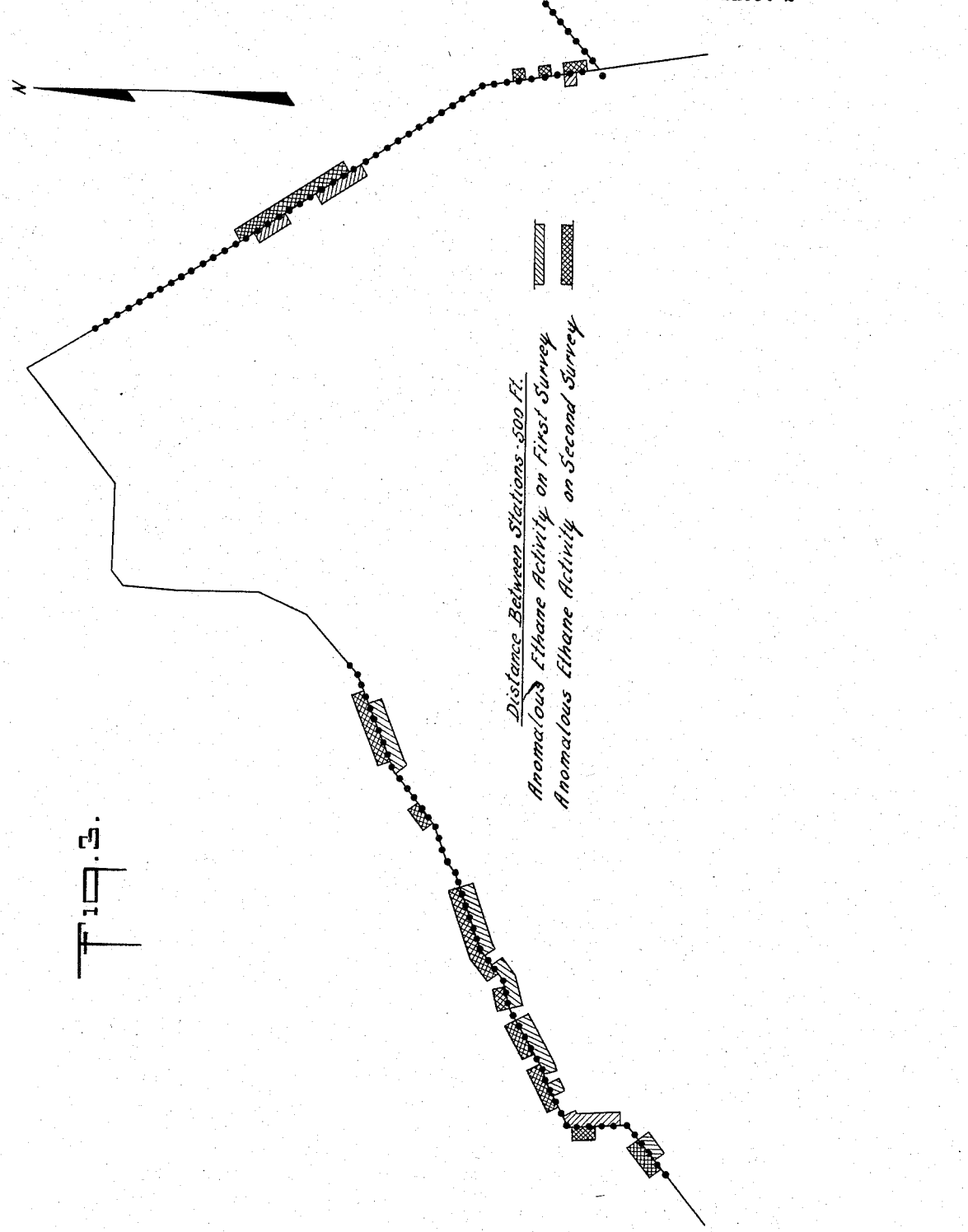

United States Patent Office 2,875,135
Patented Feb. 24, 1959

2,875,135

GEOMICROBIOLOGICAL PROSPECTING

James Maddox, Jr., Bellaire, Tex., assignor to The Texas Company, New York, N. Y., a corporation of Delaware Application December 28, 1956, Serial No. 631,081

7 Claims. (Cl. 195—103.5)

This invention relates to a process for geomicrobiological prospecting for subterranean petroleum deposits. More specifically, this invention defines an improved prospecting procedure wherein the frequency of hydrocarbon-consuming microorganisms in soil samples is correlated with subsurface petroleum deposits.

In U. S. 2,665,237, which issued January 5, 1954, and which is assigned to Texaco Development Corporation, a totally owned subsidiary of the assignee of the subject application, there is disclosed a geomicrobiological prospecting process wherein soil samples are incubated with a hydrocarbon in the presence of an aqueous inorganic salt nutrient medium conducive to optimum growth of the hydrocarbon-consuming microorganisms present in the soil samples, and the rates of hydrocarbon consumption by the soil samples under such conditions are determined and correlated with the area being prospected. The process defined in the Strawinski patent is the first practical and reliable application of microbiology to prospecting for subsurface petroleum deposits. The theory underlying the process of the Strawinski patent is that an anomalous concentration of hydrocarbon-consuming microorganisms in a soil sample indicates subsurface petroleum deposits because a continuing source of hydrocarbons is necessary for the growth and proliferation of hydrocarbon-consuming microorganisms. The subject invention involves a further refinement of the geomicrobiological prospecting process of the Strawinski patent.

In accordance with the process of this invention, representative soil samples from a given area are slurried with an aqueous inorganic salt nutrient medium conducive to optimum growth of the hydrocarbon-consuming microorganisms present in the soil samples and contacted with an oxygen-hydrocarbon mixture in a two-stage incubation involving use of quiescent contact for a period between 24 to 72 hours and agitation contact immediately thereafter. Initial incubation under quiescent conditions unexpectedly proved to be optimum for the proliferation stage wherein there is no measurable hydrocarbon utilization, whereas the agitated contact proved optimum for the consumption stage wherein there is measurable utilization of the hydrocarbon substrate by the hydrocarbon-consuming microorganisms.

As is shown in the afore-identified Strawinski patent, there are two stages in the incubation of soil samples with a hydrocarbon substrate in the presence of an aqueous nutrient medium. The first stage, also called the initial phase, involves the proliferation of the microorganisms present in the soil samples and involves no measurable consumption of the hydrocarbon substrate by the hydrocarbon-consuming microorganisms. In the second stage, also called the consumption phase, the hydrocarbon substrate is utilized in substantial amount by the hydrocarbon-consuming microorganisms. Prior to this invention, it was customary to employ either quiescent contact or agitated contact for both the initial and consumption phases of incubation. It was generally recognized that equivalent results were obtained by conducting the incubation of the soil samples under quiescent conditions or under conditions of agitation with the latter operation being recognized as faster but requiring additional equipment for shaking the large number of soil samples gathered in a typical field survey. The subject invention involves the discovery that the combined quiescent-agitation technique provides more accurate results in a minimum period of time.

The two-stage method of the invention is more sensitive to the variations in the hydrocarbon-consuming microorganism population of the test soils because both stages of incubation are effected under optimum conditions, namely quiescent contact for the proliferation stage and agitated contact for the consumption stage. The second major advantage of the process of the invention is that the incubation period is substantially reduced. The shorter incubation period makes the test more specific for the frequency of hydrocarbon-consuming microorganisms in that other undesirable biological reactions are minimized.

An additional feature of this invention is the addition of 0.5 to 5 weight percent of a finely divided surface-active siliceous material, for example, clay and diatomaceous earth, to the slurry of soil sample and aqueous nutrient medium prior to their incubation with a hydrocarbon substrate in the presence of an aqueous nutrient salt medium. The addition of the prescribed amount of clay eliminates the effect of the clay-sand content of the soil sample on the hydrocarbon utilization. The elimination of the effect of the clay-sand ratio in the soil sample on the rate of hydrocarbon gas consumption means that the rate of hydrocarbon gas consumption is directly proportional to the frequency of hydrocarbon-consuming microorganisms. The use of added clay in combination with the two-stage incubation technique results in an extremely accurate and rapid procedure for prospecting employing the geomicrobiological procedure defined in the aforeidentified Strawinski patent.

The desirability of employing a two-stage incubation for the incubation of the soil sample with hydrocarbon in the presence of an aqueous nutrient medium was proven by comparing the results obtained by the two-stage technique with results obtained by the conventional procedures wherein the incubation is effected completely under quiescent or completely under conditions of agitation. The results obtained by the process of the invention were more accurate, that is a higher degree of replication could be obtained, and in addition were obtained more rapidly than when both stages of incubation were effected under agitated contact.

It was also demonstrated by bacterial plate counts that better proliferation of the hydrocarbon-consuming microorganisms present in the soil samples is effected with quiescent contact than with agitated contact. Analysis by bacterial plate counts of the colonies of hydrocarbon-consuming microorganisms present in 2 cultures derived from the same soil sample, one by quiescent incubation and the other by agitated contact, demonstrated conclusively that more proliferation was obtained in a given time by quiescent incubation.

In demonstrating by bacterial plate counts the superiority of quiescent incubation over agitation-type contact for the proliferation of the hydrocarbon-consuming bacteria in soil samples, a soil-nutrient slurry was prepared from 250 grams of a soil sample and 700 ml. of an aqueous inorganic salt nutrient medium comprising 1 gram of ammonium nitrate, 0.1 gram of magnesium sulfate, 0.5 gram of dipotassium acid phosphate and 0.1 gram of calcium sulfate per 1,000 ml. of distilled water. After thorough blending of the soil sample and nutrient medium in a Waring Blendor, 50 ml. of soil-nutrient slurry was introduced into two gas bottles. After determination of the concentration of ethane-consuming microorganisms in soil sample prior to incubation by bacterial plate counts, the soil slurries in the two gas bottles were incubated for a period of 24 hours with a gas mixture comprising 60% ethane, 35% oxygen and 5% $CO_2$. One sample was incubated by quiescent contact and the other by shaking contact. After the 24 hour incubation period, bacterial plate counts were made on both soil samples to determine the number of ethane-consuming microorganisms. The results of this analysis are shown in Table I.

TABLE I

*Proliferation of hydrocarbon-consuming microorganisms under quiescent and agitation conditions*

|  | No. of ethane-consuming microorganisms by bacterial plate count |
|---|---|
| Initial | $1 \times 10^6$/ml. |
| Quiescent incubation—24 hours | $25 \times 10^6$/ml. |
| Agitation incubation—24 hours | $1 \times 10^6$/ml. |

The data in the foregoing table clearly demonstrate the fact that proliferation of hydrocarbon-consuming microorganisms is more rapid with quiescent incubation than with agitated incubation. The population of ethane-consuming microorganisms increased 25 fold over the initial population during quiescent incubation for a 24 hour period, while the population of ethane-consuming microorganisms remained constant during agitated incubation for the same period.

The advantages of the two-stage process of the invention are established conclusively by incubating aliquots of the same soil-nutrient medium slurry by three different procedures, namely the two-stage process of the invention, complete quiescent incubation, and complete agitated incubation. The two-stage incubation process of the invention reached the calculated end point more rapidly and with more consistent results than were obtained with either of the prior art procedures. This fact is demonstrated conclusively in the data presented in Table II.

A soil sample-nutrient medium slurry was prepared as described for the experimental results shown in Table I and 50 ml. aliquots placed in 3 sets of gas bottles and contacted with 100 cc. of the standard ethane-oxygen-$CO_2$ mixture (60% ethane-35% oxygen-5% $CO_2$). The calculated end point of this gas mixture is approximately 70 ml.±5 ml. (varies with atmospheric conditions) at which point the total oxygen content of the gas mixture has been consumed so that no further ethane utilization can occur. One set, each set comprising 2 replicates, was subjected to quiescent incubation from start to finish; another set was subjected to agitated incubation from start to finish; the third set employed the two-stage incubation technique of the invention involving 48 hours incubation under quiescent conditions and the remainder of the incubation under conditions of agitation. The results obtained in this series of experiments are shown in Table II in which the reported results are the average of the 2 bottles in each set.

TABLE II

*Comparison of two-stage incubation with quiescent incubation and agitation incubation*

| Hours incubated | Ml. of Gas Mixture Consumed | | |
|---|---|---|---|
|  | Two-Stage Incubation | Quiescent Incubation | Agitation Incubation |
| 70 | 2 | 2 | 0 |
| 80 | 4 | 4 | 1 |
| 90 | 22 | 6 | 3 |
| 100 | 50 | 8 | 14 |
| 110 | 66 | 12 | 40 |
| 120 | 66 | 16 | 60 |
| 150 | 66 | 30 | 70 |
| 200 | 66 | 50 | 70 |
| 250 | 66 | 70 | 70 |

The data in the foregoing table indicate that the end point was reached in the two-stage incubation process of the invention in 110 hours, whereas 250 hours were required for quiescent incubation and 150 hours for agitated incubation. This improvement is significant since it permits completion of a field survey in approximately 4.5 days using a two-stage incubation as contrasted with the 10 days required for the quiescent incubation and 6 days for the agitated incubation. An additional advantage employing the two-stage incubation is that the replicates reach their end point within a 5 hour period whereas the replicates in both the quiescent incubation and agitated incubation reach the end point with a spread of about 15 hours.

In Figure 1 there is shown a preferred apparatus for use in conducting geomicrobiological surveys by the two-stage incubation process of the invention. In the gas bottle 1, a slurry of soil sample and nutrient medium is shown in the bottom of the bottle. A gaseous mixture of hydrocarbon and oxygen is confined in the upper portion of the gas bottle 1 and is in communication with a closed end manometer 2. The closed end manometer 2 comprises a small bore glass tube 5 partially filled with a column of liquid; the tube 5 is open at one end and terminates at the other end in an air-filled bulb 6. The rate of the utilization of the gas mixture in the gas bottle 1 by the soil sample is determined by observing the movement of the liquid column in the tube 5 in the direction of the reduced pressure in the gas bottle 1. The main advantage of using the apparatus shown in Fig. 1 is that it permits incubation of the gas bottle in an upright or horizontal position and also eliminates the need for a reservoir bottle used in volumetric determinations.

In Fig. 2, there is shown a graphic demonstration of the two-stage incubation process of the invention in a geomicrobiological prospecting survey. In the graph shown in Fig. 2, the time of incubation in hours is plotted against the ml. of gas mixture consumed. In the initial phase, which is effected under quiescent conditions in the process of the invention, substantially no gas consumption occurs as is shown in the graph. This initial phase takes approximately 24 to 72 hours, which period is substantially shorter than the time required using agitated incubation. The consumption of the gas mixture is accelerated employing the agitated contact stage of the process of the invention. In soil samples containing an anomalous activity, that is containing a high concentration of hydrocarbon-consuming microorganisms, this growth stage is normally complete with an ethane substrate in 80 to 120 hours employing the process of the invention. With less active samples containing a normal concentration of hydrocarbon-consuming microorganisms, this growth stage is not complete until a lapse of 200 to 300 hours. The length of this growth stage varies with the hydrocarbon substrate employed; as a general proposition, the longer the chain length of the hydrocarbon substrate, the longer the period required for completion of the growth stage. As disclosed in the afore-identified Strawinski patent, incubation is terminated after the most active samples have completed their growth stage and the activity of the other soils taken as a percentage based on the amount of gas mixture consumed in comparison with the amount consumed by the most active samples.

The amount of surface-active siliceous material necessary to eliminate the effect of the clay-sand ratio variable in the soil samples is 0.5 to 5 weight percent of the soil-nutrient medium slurry. Addition of less than 0.5 percent clay or diatomaceous earth to the soil-nutrient medium slurry has been demonstrated to be ineffective in eliminating the effect of the soil variable on the rate of hydrocarbon consumption. The upper limit of 5 weight percent is set because larger amounts of clay are not needed to eliminate the soil variable and actually tend to mask the action of the hydrocarbon-consuming microorganism population in the various soil samples. When the concentration of the added clay falls within the prescribed amount, the soil-type variable is eliminated so that the rate of hydrocarbon consumption is a direct function of the relative numbers of hydrocarbon-consuming microorganisms in the soil samples.

The prescribed amount of clay is advantageously added to the soil suspended in the aqueous nutrient inorganic salt medium. A convenient procedure for obtaining the desired concentration of added clay is to prepare an inorganic salt nutrient medium of the type described heretofore and suspended therein 2 weight percent Magcogel, a bentonitic drilling-type clay. The weight ratio of aqueous nutrient medium to soil generally falls between the limits of 1 to 20 parts of nutrient medium per part of soil sample.

The two-stage incubation process of the invention was employed in 3 separate surveys in different counties of Texas, namely Zapata, Atascosa and Anderson. Approximately 100 samples were collected along a traverse in each area and the activity of the various soil samples to utilize an ethane-oxygen mixture was determined by the two-stage incubation technique described in this invention. The stations having anomalous ethane activity in each of the three areas were noted. After an interval of 1 to 3 months, soil samples were collected from each of the same areas along the same traverse and the samples retested by the two-stage incubation process of the invention and the stations having anomalous ethane consumption activity were noted. The results of the recheck were compared with the results of the initial run and excellent correlation between the areas of anomalous activity were noted. It was concluded from these three area surveys that the two-stage incubation process of the invention gave very satisfactory rechecks of ethane activity. The two-stage incubation method gave a much higher degree of accuracy in areal rechecks than similar type experiments wherein the initial and recheck surveys were made either by the totally quiescent incubation method or by the totally agitated incubation method.

The results of one of the areal rechecks employing the two-stage incubation procedure is shown graphically in Fig. 3. The stations showing anomalous activity on the initial survey are marked by shading below the traverse line of the survey. Stations showing anomalous ethane activity on the recheck are marked by cross-hatched shading above the traverse line. The remaining stations are unmarked and denote those stations possessing normal ethane activity. It will be noted that excellent replication was obtained employing the two-stage process of the invention for geomicrobiological prospecting.

Obviously, many modifications and variations of the invention, as hereinbefore set forth, may be made without departing from the spirit and scope thereof and, therefore, only such limitations should be imposed as are indicated in the appended claims.

I claim:

1. In a geomicrobiological prospecting process wherein soil samples are incubated with a hydrocarbon substrate in the presence of aqueous inorganic salt nutrient medium conducive to optimum growth of hydrocarbon-consuming microorganisms in the soil samples and the rates of hydrocarbon consumption are determined and correlated with the area being prospected as a measure of subsurface petroleum deposits, the improvement which comprises incubating a reaction mixture comprising hydrocarbon substrate, soil sample and aqueous inorganic salt nutrient medium under quiescent conditions for a period of 24 to 72 hours and immediately thereafter incubating said reaction mixture under conditions of agitation.

2. The improvement according to claim 1 in which said reaction mixture comprises soil sample, nutrient medium and a gas mixture comprising oxygen and gaseous hydrocarbon.

3. The improvement according to claim 1 in which the reaction mixture comprises soil sample, aqueous inorganic salt nutrient medium and a gas mixture comprising 60% ethane, 35% oxygen and 5% carbon dioxide.

4. In a geomicrobiological prospecting process wherein soil samples are incubated with a hydrocarbon substrate in the presence of aqueous inorganic salt nutrient medium conducive to optimum growth of hydrocarbon-consuming microorganisms in the soil samples and the rates of hydrocarbon consumption are determined and correlated with the area being prospected as a measure of subsurface petroleum deposits, the improvement which comprises adding a surface-active adsorbent siliceous material to the mixture of soil sample and aqueous nutrient medium in an amount equivalent to 0.5 to 5 weight percent of said soil sample-aqueous nutrient medium mixture, contacting said mixture of soil sample, nutrient medium and adsorbent material with a gas mixture comprising gaseous hydrocarbon and oxygen, incubating the resulting reaction mixture under quiescent conditions for a period of 24 to 72 hours and immediately thereafter incubating said reaction mixture under conditions of agitation.

5. The improvement according to claim 4 in which said adsorbent material is diatomaceous earth.

6. The improvement according to claim 4 in which said adsorbent material is bentonitic clay.

7. The improvement according to claim 4 in which said gas mixture comprises 60 percent ethane, 35 percent oxygen and 5 percent $CO_2$.

References Cited in the file of this patent

UNITED STATES PATENTS 2,665,237     Strawinski     Jan. 5, 1954

OTHER REFERENCES

Beerstecher: "Petroleum Microbiology," 1954, publ. by Elsevier Press, Inc. (Houston), pp. 148 to 152.

Porter: "Bacterial Chemistry and Physiology," 1947, publ. by John Wiley & Sons, Inc. (N. Y.), pp. 102 to 108, 128, and 130.